United States Patent [19]
Chiu

[11] Patent Number: 5,277,480
[45] Date of Patent: * Jan. 11, 1994

[54] WHEEL UNIT FOR A BABY CARRIAGE

[75] Inventor: Hsiu-Hui Chiu, Tainan Hsien, Taiwan

[73] Assignee: Sunshon Molding Co., Ltd., Tainan Hsien, Taiwan

[*] Notice: The portion of the term of this patent subsequent to Feb. 23, 2010 has been disclaimed.

[21] Appl. No.: 997,194

[22] Filed: Dec. 28, 1992

[51] Int. Cl.$^5$ .............................................. B60B 37/10
[52] U.S. Cl. ..................... 301/111; 301/119
[58] Field of Search ............... 301/111, 112, 119, 120, 301/121; 280/647, 654, 47.24, 646

[56] References Cited
U.S. PATENT DOCUMENTS 1,194,698  8/1916  Ayres ................................. 301/119
5,188,430  2/1993  Chiu ................................... 301/111

FOREIGN PATENT DOCUMENTS 3811757  10/1989  Fed. Rep. of Germany ...... 301/111

Primary Examiner—Russell D. Stormer
Attorney, Agent, or Firm—Morton J. Rosenberg; David I. Klein

[57] ABSTRACT

A wheel unit for a baby carriage comprises a wheel fixed on a wheel rim, a sleeve member rotatably and releasably disposed in an axial through opening of the wheel rim, and having an axial through bore, and a plurality of hooks and a flange formed on the first and second ends, respectively, of the sleeve member, a pair of pressing plates formed on the flange of the sleeve member, and an axle disposed in the axial through bore of the sleeve member and having an annular groove which is releasably engaged by arcuate-shaped, lower edges of the pressing plates.

1 Claim, 5 Drawing Sheets

WHEEL UNIT FOR A BABY CARRIAGE

BACKGROUND OF THE INVENTION

A conventional wheel unit used in a conventional baby carriage, as shown in FIGS. 4–6, comprises two wheels 4 and 4' fixed by a shaft support 5 pivotally connected to a support rod 6. The shaft support 5 supports a shaft 7, which passes through the wheel 4' and then through the wheel 4 before being connected to a fixer 72. The fixer 72 has an annular groove 71 which receives a pinch ring 73 for preventing the wheels 4 and 4' from falling off. The wheel unit is covered by a seal cover 74. When the pinch ring 73 is pulled downwardly, it disengages from an annular groove 71, thereby allowing the wheel 4 to be removed from the shaft 7. The conventional wheel unit shown in FIGS. 4–6 has the following disadvantages:
1. The structure of the wheel unit is too complicated.
2. The pinch ring 73 and the shaft 7 are both made of metal, which is susceptible to rust.
3. Wheels 4 and 4' may have different central opening sizes, which increases the manufacturing costs.

SUMMARY OF THE INVENTION

The present invention has been devised to offer a wheel unit for a baby carriage with the following advantages:
1. A special tool is not needed to take off the wheel unit.
2. An axle and a sleeve member are provided for assembling the wheel unit in a quick and easy manner.
3. The wheel unit of the present invention has fewer components than the prior art wheel units, thereby reducing the costs of packaging and transportation of the wheel unit of the present invention.
4. The shaft and shaft tube are made of a strong, anti-friction plastic, thereby preventing rusting of these components.

BRIEF DESCRIPTION OF THE DRAWINGS

The invention will be better understood with reference to the accompanying Drawings, wherein.

DETAILED DESCRIPTION OF THE DRAWINGS

Figure 1:
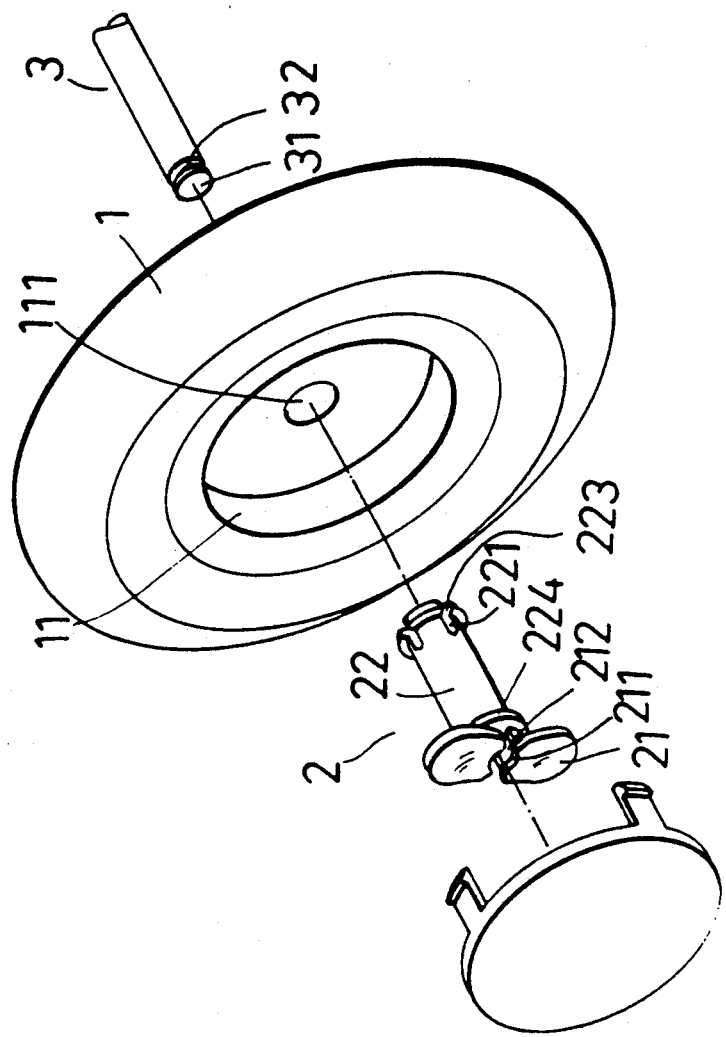
FIG. 1 is an exploded perspective view of a wheel unit for a baby carriage of the present invention.
Figure 2:
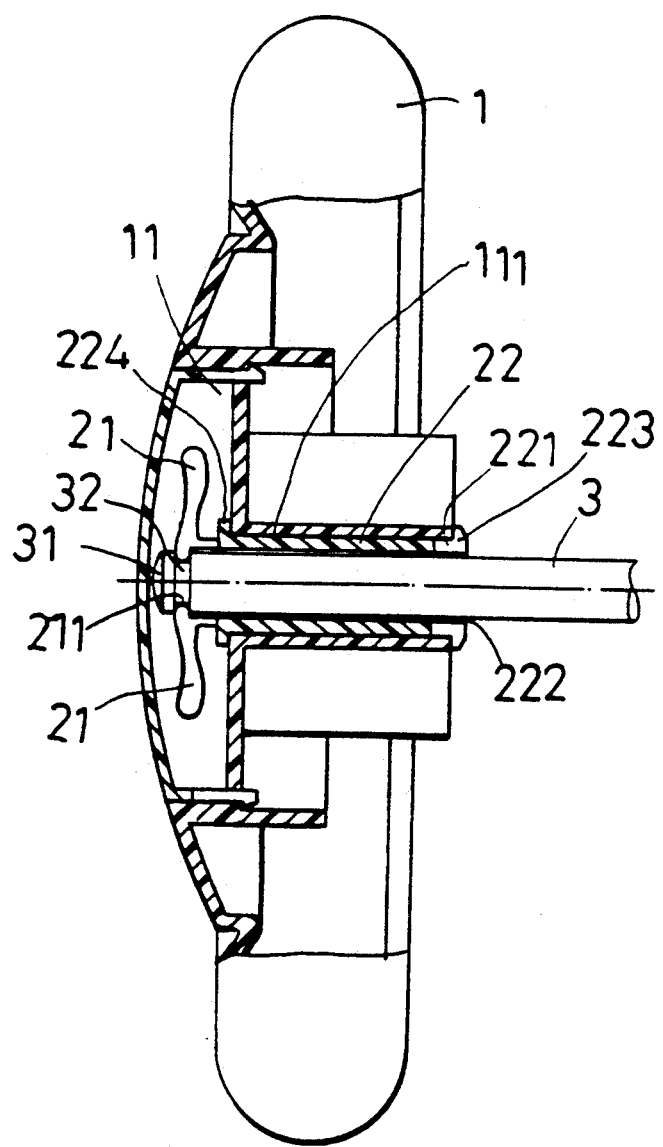
FIG. 2 is a side cross-sectional view of the wheel unit for a baby carriage of the present invention.
Figure 3:
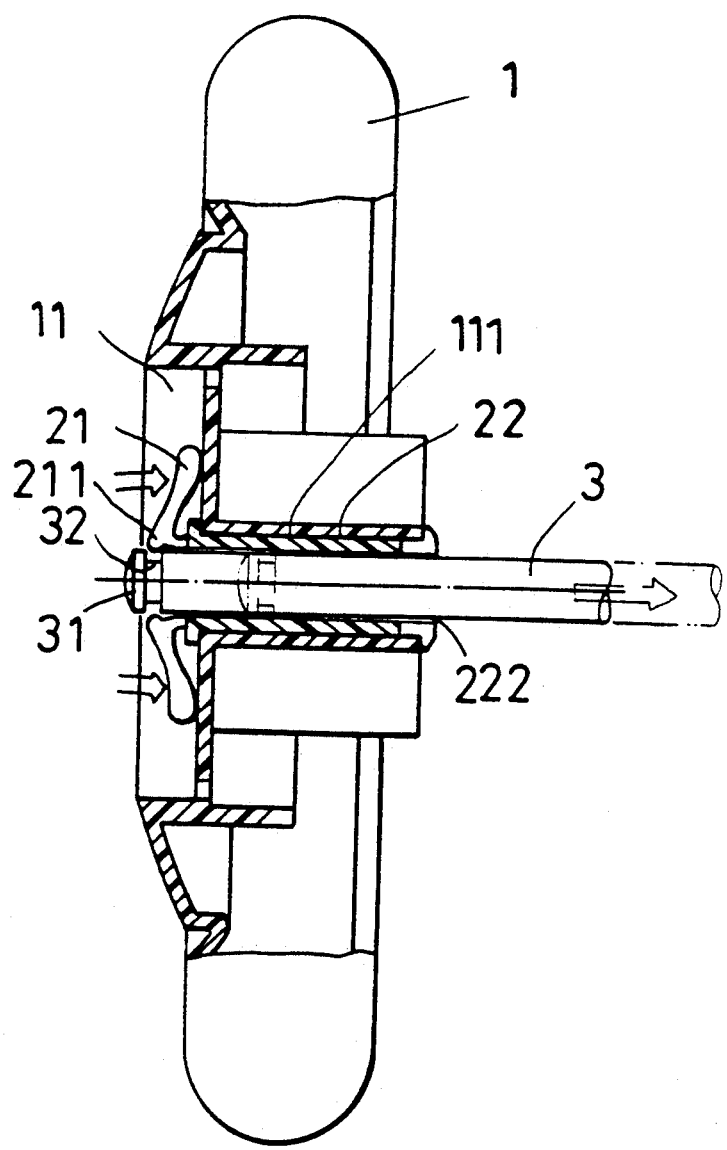
FIG. 3 is a side cross-sectional view of the wheel unit for the baby carriage of the present invention, showing the disassemblage of the same.
Figure 4:
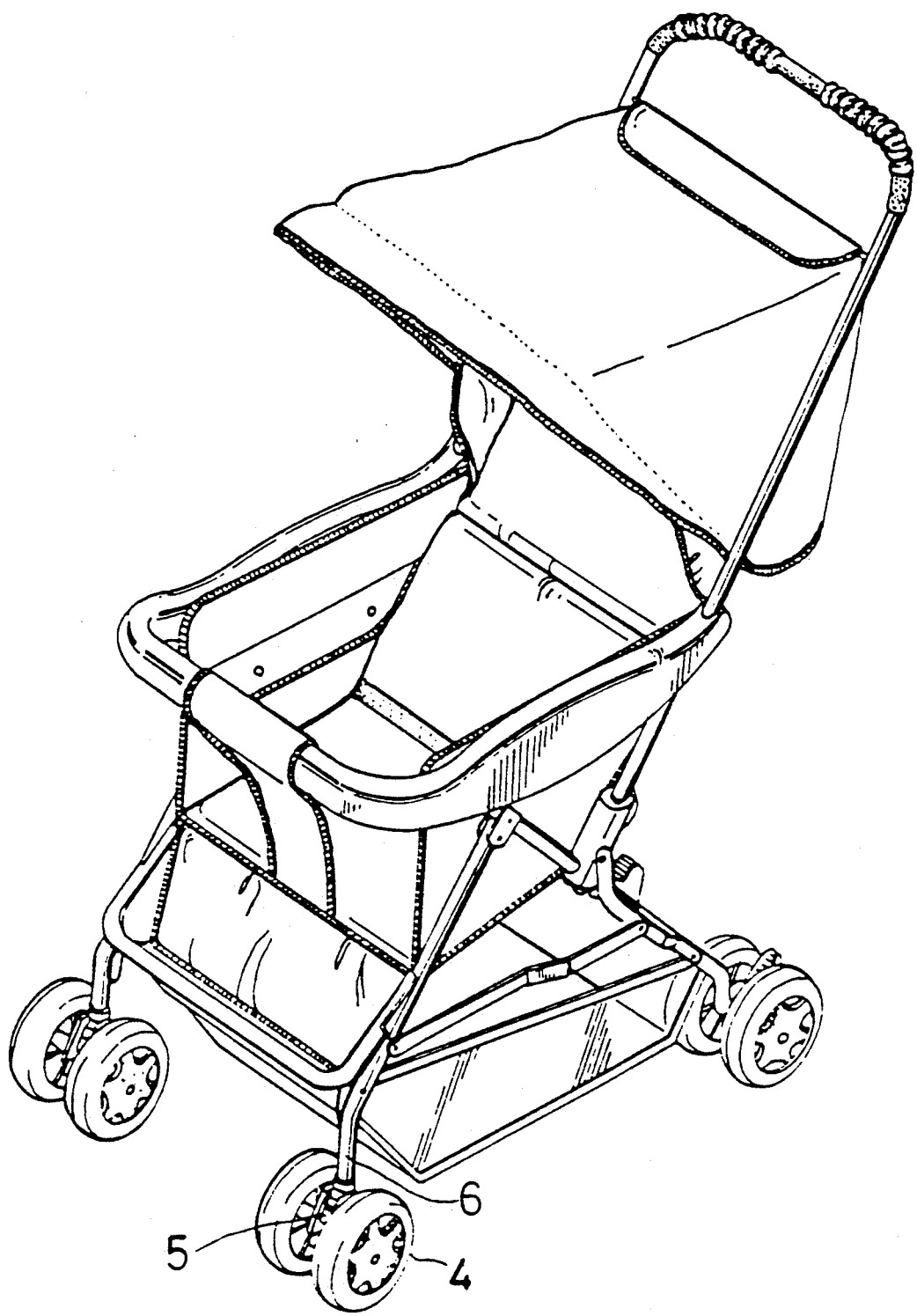
FIG. 4 is a perspective view of a conventional baby carriage.
Figure 6:
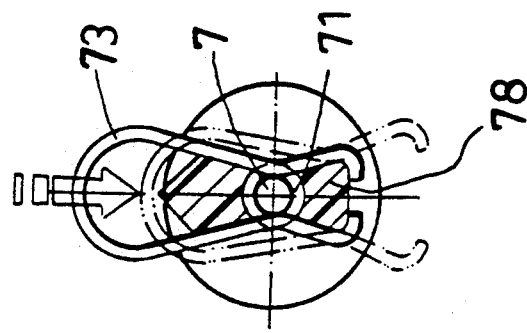
Figure 5:
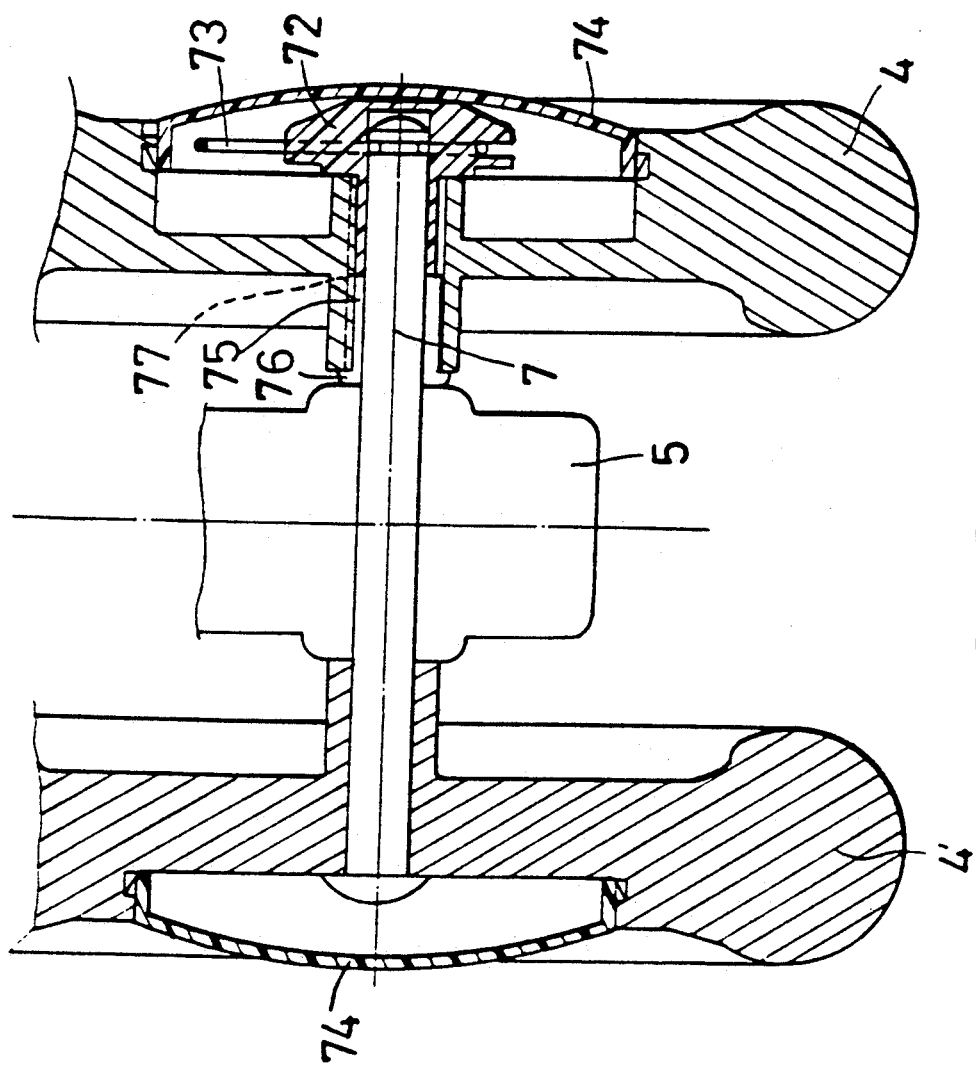
FIG. 5 is a cross-sectional view of a conventional wheel unit of a conventional baby carriage with FIG. 4; and, FIG. 6 is a cross-sectional view of related components for disassembling the conventional wheel unit of the conventional baby carriage.

Referring to FIGS. 1–3, the wheel unit of the present invention comprises a wheel rim 11, a wheel 1, a sleeve member 2, and an axle 3. The wheel rim 11 is provided with an axial through opening 111 having an outer side surface and an inner side surface. The wheel 1 is disposed on the wheel rim 11.

The sleeve member 2 comprises axial through bore 222, first and second open ends, a plurality of hooks 221 disposed around the first end of the tubular portion 22, and a flange 224 formed on the second end of the tubular portion 22. Each hook 221 has a sloped surface 223. A pair of pressing plates 21 extend laterally from the flange 224 in opposing directions. The pressing plates 21 have arcuate-shaped, lower edges 211 which define a substantially circular-shaped opening 212 therebetween. The axle 3 comprises an elongated cylindrical member having first and second ends, and an annular groove 32 formed in the axle 3 adjacent the first end 31.

When assembling, the first end of the tubular sleeve member 2 is inserted into and through the axial through opening 111 of the wheel rim 11 until the hooks 221 engage the inner side surface of the axial through opening 111 and the flange 224 abuts the outer side surface of the axial through opening 111, thereby rotatably securing the sleeve member 2 within the axial through opening 111. Next, the first end 31 of the axle 3 is inserted into the second open end of the tubular portion 22 until the first end 31 of the axle 3 extends through the first open end of the tubular portion 22 and the arcuate-shaped, lower surfaces 211 of the pressing plates 21 engage the annular groove 32 of the axle 3, thereby securing the axle 3 in the axial through bore 222 of tubular portion 22. When disassembling, as shown in FIG. 3, the pressing plates 21 are pressed inwardly until the arcuate-shaped, lower edges 211 of the pressing plates 21 are disengaged from the annular groove 32 of the axle 3, thereby allowing the axle 3 to be pulled from the axial through bore 222 of the tubular portion 22. Next, the hooks 221 of the tubular portion 22 are pressed inwardly until they can be passed through the axial through opening 111 of the wheel rim 11, thereby allowing the sleeve member 2 to be pulled from the axial through opening 111.

While the preferred embodiment of the invention has been described above, it will be recognized and understood that various modifications may be made therein and the appended claim is intended to cover all such modifications which may fall within the spirit and scope of the invention.

What is claimed is:
1. A wheel unit for a baby carriage comprising:
a wheel rim having an axial through opening, said axial through opening having inner and outer side surfaces;
a wheel disposed on said wheel rim;
a tubular sleeve member adapted to be releasably and rotatably received within said axial through opening of said wheel rim, said sleeve member having a tubular portion with an axial through bore, first and second open ends, a plurality of hooks and a flange formed on said first and second ends, respectively, of said tubular portion for releasably and rotatably securing said sleeve member in said axial through opening of said wheel rim, and a pair of pressing plates extending laterally from said flange in opposing directions, said pressing plates further including arcuate-shaped, lower edges; and,
a cylindrical axle adapted to be releasably received in said axial through bore of said sleeve member, said axle having first and second ends, and an annular groove formed adjacent said first end of said axle, wherein said arcuate-shaped lower surfaces of said pressing plates are adapted to be received in said annular groove of said axle, and said pressing plates may be pushed inwardly for releasing said arcuate-shaped, lower edges of said pressing plates from said annular groove of said axle.

* * * * *